United States Patent
Kostrov et al.

(10) Patent No.: US 8,459,351 B2
(45) Date of Patent: Jun. 11, 2013

(54) METHOD AND APPARATUS FOR PRODUCING SHOCK WAVES IN THE BOREHOLE OF WELLS FILLED BY LIQUID

(76) Inventors: Sergey A Kostrov, Frisco, TX (US); William O Wooden, Plano, TX (US)

( * ) Notice: Subject to any disclaimer, the term of this patent is extended or adjusted under 35 U.S.C. 154(b) by 0 days.

(21) Appl. No.: 13/372,827

(22) Filed: Feb. 14, 2012

(65) Prior Publication Data

US 2012/0175107 A1    Jul. 12, 2012

(51) Int. Cl.
    *E21B 43/25*    (2006.01)
(52) U.S. Cl.
    USPC ............. 166/249; 166/177.1; 166/177.6
(58) Field of Classification Search
    USPC ............. 166/249, 177.1, 177.2, 177.5, 177.6
    See application file for complete search history.

(56) References Cited

U.S. PATENT DOCUMENTS

| | | | | |
|---|---|---|---|---|
| 3,209,834 A | * | 10/1965 | Essary | 166/177.2 |
| 5,586,602 A | * | 12/1996 | Vagin | 166/249 |
| 5,950,726 A | * | 9/1999 | Roberts | 166/249 |
| 6,015,010 A | * | 1/2000 | Kostrov | 166/249 |
| 2002/0185276 A1 | * | 12/2002 | Muller et al. | 166/297 |

* cited by examiner

Primary Examiner — William P Neuder

(57) ABSTRACT

The method and apparatus for producing shock waves in a well wherein a device connected to the bottom of the tubing string in the borehole of the well filled by liquid and containing the upper and lower plungers movably arranged within corresponding cylinders for compressing a liquid inside the compression chamber and discharging the liquid into the borehole on upstroke thereby generating a shock wave. In addition, providing an exit of the lower plunger out of the lower cylinder at the top of upstroke of pumping unit on the distance λ determined by the following formulae:

$$\lambda \geq \frac{(D_1^2 - D_2^2)A_{sw}H}{Ed_r^2},$$

where $D_1$ and $D_2$ are the outside diameters of the lower and upper plungers, $A_{sw}$ is the amplitude of generated shock wave, H is a depth of the lower plunger at the top of upstroke, E is modulus of elasticity of the sucker rod's material, $d_r$ is the diameter of sucker rods.

6 Claims, 2 Drawing Sheets

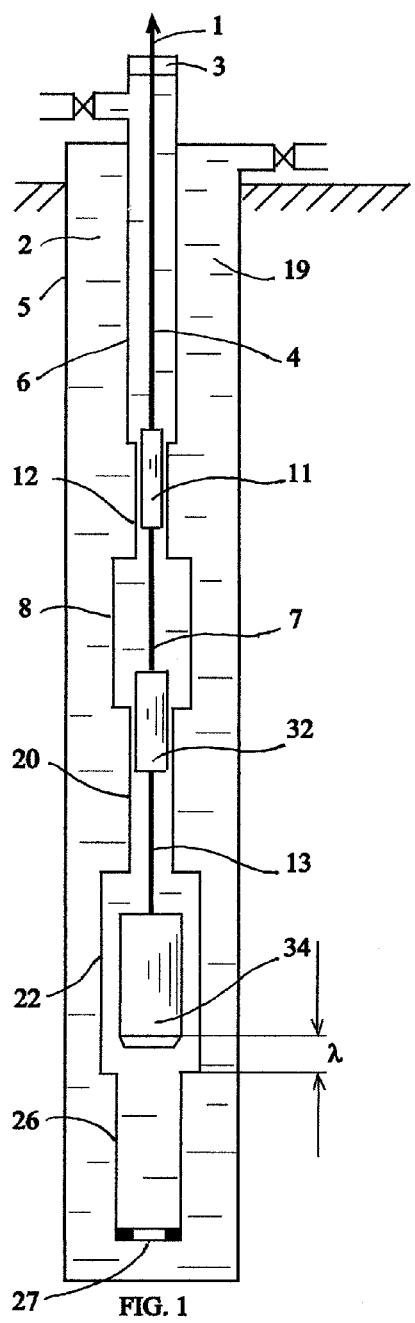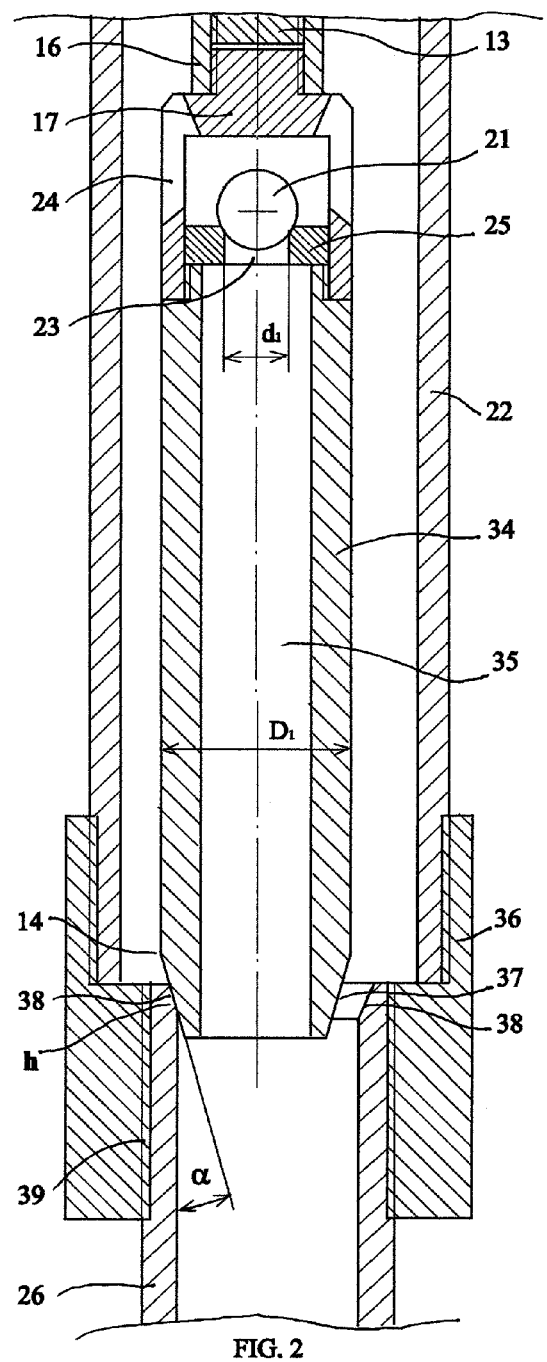
FIG. 1
FIG. 2

METHOD AND APPARATUS FOR PRODUCING SHOCK WAVES IN THE BOREHOLE OF WELLS FILLED BY LIQUID

BACKGROUND OF THE INVENTION

The present invention relates to a shock wave generating method and device and, more particularly, to a method and device for repeatedly generating shock waves in a well borehole to increase oil recovery and oil production and to carry out continuous seismic surveys of an oil bearing formation.

BRIEF DESCRIPTION OF PRIOR ART

The U.S. Pat. No. 6,015,010, No. 6,899,175 and No. 7,980,301 disclose methods and apparatuses for increasing the efficiency of shock wave stimulation of oil bearing beds. However the implementation of methods in accordance with U.S. Pat. No. 6,015,010, No. 6,899,175 and No. 7,980,301 have their drawbacks, i.e. the methods and apparatuses are not optimal from the point of view of efficiency and reliability of some parts of the devices implemented in accordance with U.S. Pat. No. 6,015,010, No. 6,899,175 and No. 7,980,301. In particularly some parts of the device could become unscrewed from one another as a result of the substantial impact force acting on these parts during operation of the device.

The present invention was developed to overcome drawbacks of prior methods and devices by providing an improved method and apparatus for producing shock waves in a borehole of a well filled or partially filled by a liquid.

SUMMARY OF INVENTION

Accordingly, a primary object of the present invention is to provide an apparatus for producing a shock wave in wells filled or partially filled by a liquid which includes a pumping unit arranged at the wellhead, a tubing string extending downwardly into the well borehole, an elongated damper cylinder connected to the bottom of tubing string at the upper end and to a damper chamber at the lower end. The damper chamber is connected to an upper cylinder. In addition, the elongated damper cylinder has a different internal diameter than internal diameter of the upper cylinder. The damper plunger is movably arranged within elongated damper cylinder and connected to the pumping unit by means at least one sucker rod and polish rod at the upper end and to the upper plunger, which in turn is movably arranged within the upper cylinder, at the lower end for creating a constant counterforce inside the damper chamber on upstroke of the pumping unit as a result of constant flow of fluid from the damper chamber into the borehole of the well or from the borehole of the well into the damper chamber through at least one hole on the side surface of the damper chamber or, as an alternative, through the channel inside a damper plunger hydraulically connecting damper chamber with tubing string. In addition, an upper cylinder is connected to a lower cylinder via compression chamber and the upper cylinder has a smaller internal diameter than the lower cylinder and is connected to the lower cylinder. A lower plunger movably arranged within the lower cylinder and the upper and lower plungers are connected to each other by means of at least one sucker rod for compressing a liquid contained within the compression chamber and discharging the liquid into borehole of a well when the lower plunger exits out of lower cylinder on the upstroke of pumping unit thereby generating a shock wave. In addition, a lower plunger has a check valve attached to its upper end, and the check valve consists of a cage, ball and seat having a hole for supplying a liquid from borehole into the compression chamber via the lower cylinder and internal channel inside the lower plunger and a hole inside a seat on downstroke of pumping unit. The hole has a diameter $d_1$ determined by the following formulae:

$$d_1 \geq \sqrt{\frac{(D_1^2 - D_2^2)N_{str}(kL_{str})^{\frac{1}{2}}}{30\sqrt{2}\,g}},$$

where $D_1$ is the outside diameter of lower plunger, $D_2$ is the outside diameter of the upper plunger, $L_{str}$ is the length of stroke of the pumping unit, $N_{str}$ is the number of strokes per minute of the pumping unit, k is the coefficient of hydrodynamic resistance of the seat hole and g is a gravity acceleration.

It is another object of the invention to provide an apparatus for producing a shock wave in wells filled or partially filled by a liquid in which a lower plunger has a taper at the lower end interacting with a bevel made on the upper end of lower cylinder during the re-entering of lower plunger into the lower cylinder on the downstroke of the pumping unit and the taper has an angle $\alpha$ relatively to vertical symmetry axis of the lower plunger determined by the following formulae:

$$\alpha \leq \frac{1}{2}\text{Arc}\sin\left(\frac{2Fh}{MV_0^2}\right),$$

where F is a minimal required force applied for screwing up a lower cylinder, h is a length of interaction between taper of lower plunger and bevel of lower cylinder during the re-entering of lower plunger into the lower cylinder on downstroke of pumping unit, M is a total weight of all sucker rods, plungers and polish rod and $V_0$ is vertical velocity of lower plunger on downstroke determined by formulae:

$$V_0 = \frac{L_{str}N_{str}}{30},$$

where $L_{str}$ is the length of stroke of the pumping unit, $N_{str}$ is number of strokes per minute of the pumping unit.

It is another object of the invention to provide an apparatus for producing a shock wave in wells filled or partially filled by a liquid in which a lower cylinder has a bevel at the upper end interacting with a taper made on the lower end of the lower plunger during the re-entering of lower plunger into the lower cylinder on the downstroke of the pumping unit and the bevel has an angle $\alpha$ relatively to vertical symmetry axis of lower cylinder determined by the following formulae:

$$\alpha \leq \frac{1}{2}\text{Arc}\sin\left(\frac{2Fh}{MV_0^2}\right),$$

where F is a minimal required force applied for screwing lower cylinder, h is a length of interaction between taper of the lower plunger and the bevel of the lower cylinder during the re-entering of lower plunger into the lower cylinder on downstroke of pumping unit, M is a total weight of all sucker rods, plungers and polish rod and $V_0$ is vertical velocity of lower plunger on downstroke determined by formulae:

$$V_0 = \frac{L_{str} N_{str}}{30},$$

where $L_{str}$ is the length of stroke of the pumping unit, $N_{str}$ is number of the strokes per minute of the pumping unit.

It is another object of the invention to provide an apparatus for producing a shock wave in wells filled or partially filled by liquid in which lower cylinder has an upset of its outer diameter at the upper end and connected to compression chamber by means of corresponding threads inside of a barrel coupling. In addition, the barrel coupling is connected at its butt lower end to a butt upper end of collet by at least one screw and thread inside a barrel coupling connecting the barrel coupling to a lower cylinder has a diameter equaled to diameter of lower cylinder upset meanwhile the internal diameter of collet has a diameter smaller than outer diameter of lower cylinder upset thereby preventing the moving of the barrel coupling connected to a collet and unscrewing of a lower cylinder from said barrel coupling during operation of the apparatus.

It is another object of the invention to provide an apparatus for producing a shock wave in wells filled or partially filled by liquid in which the compression chamber and a lower cylinder are connected to each other by means of corresponding threads inside of a barrel coupling. In addition, the barrel coupling has an additional outer thread and a taper at its lower end and the barrel coupling is connected to a beveled nut having a bevel at its lower end by means of the outer thread on barrel coupling and internal thread on beveled nut in such manner that during the screwing up of the beveled nut onto the barrel coupling and interacting between bevel on beveled nut and taper on barrel coupling a squeezing force from said beveled nut acting on the outer surface of the lower cylinder via taper on the barrel coupling is created thereby preventing the unscrewing of a lower cylinder from the barrel coupling during operation of apparatus.

It is a further object of the present invention to provide a method for producing a shock wave in wells filled or partially filled by liquid which includes the steps of: positioning a device connected to the bottom of the tubing string in the borehole of the well filled by liquid and consisting of an elongated damper cylinder connected to the bottom of the tubing string at the upper end and to a damper chamber at the lower end and the damper chamber is connected to an upper cylinder, the elongated damper cylinder having a different internal diameter than internal diameter of the upper cylinder and the elongated cylinder has a hydraulic connection with borehole of well via at least one hole on its side surface, a damper plunger movably arranged within the elongated damper cylinder and connected to the pumping unit by means at least one sucker rod and polish rod at the upper end and connected to the upper plunger by at least one sucker rod at the lower end for creating a constant counterforce inside the damper chamber on upstroke of the pumping unit as a result of constant flow of fluid from damper chamber into the borehole of the well or from the borehole of the well into the damper chamber through at least one hole on the side surface of the damper chamber, the upper cylinder connected to a lower cylinder via a compression chamber and having a smaller internal diameter than lower cylinder, upper plunger connected to lower plunger by means of at least one sucker rod and the upper and lower plungers movably arranged within upper and lower cylinders, correspondingly, for compressing a liquid contained within the compression chamber and discharging the liquid into the borehole when the lower plunger exits out of the lower cylinder on upstroke thereby generating a shock wave. In addition, providing an exit of the lower plunger out of the lower cylinder at the top of the upstroke of the pumping unit on the distance determined by the following formulae:

$$\lambda \geq \frac{(D_1^2 - D_2^2) A_{sw} H}{E d_r^2},$$

where $\lambda$ is the exit distance of lower plunger out of the lower cylinder at the top of upstroke of pumping unit, $D_1$ is the outside diameter of the lower plunger, $D_2$ is the outside diameter of the upper plunger, $A_{sw}$ is the required amplitude of the generated shock wave, H is the depth of the lower plunger position at the top of upstroke of pumping unit, E is modulus of elasticity of the sucker rod's material, $d_r$ is the diameter of sucker rods.

BRIEF DESCRIPTION OF THE DRAWINGS

Other objects and advantages of the invention will become apparent from the study of the following specification when viewed in light of the accompanying drawings, in which:

FIG. 1 is a cross-sectional side view of the device installed in the well borehole according to the invention.

FIG. 2 is a cross-sectional view of the compression chamber, barrel coupling, lower cylinder, lower plunger, cage, ball and a seat with hole.

DETAILED DESCRIPTION

Figure 3:
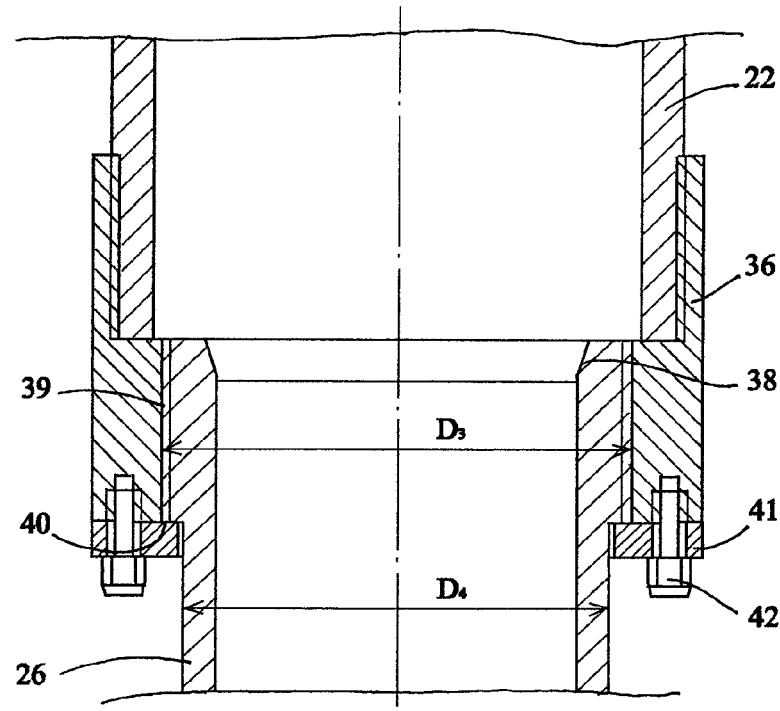
FIG. 3 is a cross-sectional view of the compression chamber, barrel coupling and a lower cylinder with upset outer diameter.

Referring to FIGS. 1 and 2 there is shown a device for producing a shock wave in borehole 19 of a well filled or partially filled by liquid 2. The device includes a pumping unit (not shown) arranged at the wellhead of the well, a tubing string 6 extending downwardly into the production casing 5 of the well, the elongated damper cylinder 12 installed at the end of tubing string 6, the damper chamber 8 installed at the end of the elongated damper cylinder 12 and connected to the upper cylinder 20 which in turn is connected to the compression chamber 22 connected to the lower cylinder 26. The damper plunger 11 is moveably arranged within the elongated damper cylinder 12 and connected at its upper end to the pumping unit by means of sucker rod string 4, having at least one sucker rod 4 and a polish rod 1 movably arranged in the stuffing box 3, and connected at its lower end by means of at least one sucker rod 7 to the upper plunger 32, and said upper plunger 32 is moveably arranged within upper cylinder 20. The upper plunger 32 is connected at its lower end to the lower plunger 34 by means of at least one sucker rod 13 and the lower plunger 34 is moveably arranged within the lower cylinder 26. The damper chamber 8 has at least one hole (not shown) providing a hydraulic communication between internal volume of the damper chamber 8 and the well borehole 19 for creating a constant counterforce inside the damper chamber 8 on the upstroke of the pumping unit as a result of constant flow of fluid from damper chamber 8 into the borehole 19 of the well or from the borehole of the well into the damper chamber through at least one hole on the side surface of damper chamber 8. During the upstroke of the pumping unit, the volume of compression chamber 22 is reduced due to the smaller diameter upper plunger 32 compared with diameter of lower plunger 34. Accordingly, the liquid contained therein is compressed and as far as the lower plunger 34 exits out of the top of lower cylinder 26 this liquid is discharged into the lower cylinder 26 and farther via an amplifier 27 into the borehole 19 of the well thereby generating a shock wave in accordance with well known hydro-impact phenomenon. The compression of liquid inside the compression chamber 22 causes the appearance of a tension force acting on the sucker rod strings 4, 7 and 13 which in turn causes the stretching of the sucker rods. As a result, on the top of upstroke of the pumping unit the lower plunger 34 must exit from the lower cylinder 26 on some minimal distance λ in order to overcome such stretching and to generate a shock wave, otherwise the lower plunger 34 would remain inside the lower cylinder 26 there will be no any discharging of compressed liquid from compression chamber 22. In fact, the edge 14 between outer surface of lower plunger 34 and its taper 37 must come out of the lower cylinder 26 by a distance λ determined by the following formulae:

$$\lambda \geq \frac{(D_1^2 - D_2^2)A_{sw}H}{Ed_r^2},$$

where $D_1$ is the outside diameter of the lower plunger 34, $D_2$ is the outside diameter of the upper plunger 32, $A_{sw}$ is the required amplitude of generated shock wave, H is the depth of the lower plunger position at the top of the upstroke of the pumping unit, E is a modulus of elasticity of the sucker rod's material, $d_r$ is the diameter of sucker rods. In particular, $\lambda \geq 0.26$ m for the following parameters: $D_1 = 0.082$ m, $D_2 = 0.07$ m, $A_{sw} = 21 \times 10^6$ Pa, H=1000 m, E=$2.12 \times 10^{11}$ Pa and $d_r = 0.0254$ m.

As shown on FIG. 2, the lower plunger 34 includes a cage 17 having a ports 24, ball 21 and a seat 25 having a hole 23. The cage 17 is connected to at least one rod 13 by means of rod coupling 16. When lower plunger 34 is displaced upwardly on the upstroke of the pumping unit the ball 21 engages a seat 25 thereby preventing the flow of liquid through the channel 35 of the lower plunger 34 thereby providing a compression of liquid contained in the compression chamber 22. When the lower plunger 34 is displaced downwardly on the downstroke of the pumping unit the ball 21 disengages the seat 25 allowing liquid to flow upwardly through the channel 35 and hole 23 into the compression chamber 22. The diameter of hole 23 has to be big enough to supply a required volume of liquid into the compression chamber 22 on the downstroke of the pumping unit in order to provide the compressing of liquid contained inside the compression chamber 22 during the upstroke of the pumping unit. Accordingly, the hole has to have a diameter $d_1$ determined by the following formulae:

$$d_1 \geq \sqrt{\frac{(D_1^2 - D_2^2)N_{str}(kL_{str})^{\frac{1}{2}}}{30\sqrt{2}\,g}},$$

where $D_1$ is the outside diameter of the lower plunger 34, $D_2$ is the outside diameter of the upper plunger 32, $L_{str}$ is the length of stroke of the pumping unit, $N_{str}$ is number of strokes per minute of the pumping unit, k is coefficient of hydrodynamic resistance of the seat hole 23 and g is a gravity acceleration.

In particular, $d_1 \geq 0.012$ m for the following parameters: $D_1 = 0.082$ m, $D_2 = 0.07$ m, $L_{str} = 3$ m, $N_{str} = 6$, k=1.1 and g=9.81 m/s².

As shown on FIG. 2, a lower plunger 34 has a taper 37 at the lower end interacting with a bevel 38 made on the upper end of the lower cylinder 26 during the re-entering of the lower plunger 34 into the lower cylinder 26 on the downstroke of the pumping unit. It happens because there is an eccentricity between the outer diameter of the lower plunger 34 and inner diameter of the compression chamber 22. Without taper 37 and bevel 38 the peak impact force acting on the thread 39 between the lower cylinder 26 and the barrel coupling 36 could be as high as 100 tons exceeding the minimal required force applied to the lower cylinder-barrel coupling connection thereby causing the unscrewing of the lower cylinder 26 from the barrel coupling 36 and falling of the lower cylinder 26 to the bottom of the borehole 19. Such high impact forces could appear due to the fact that the total weight of sucker rods 4, 7 and 13 plus weight of the plungers 11, 32 and 34 could be a few tons depending on installation depth of the device. In order to reduce the impact force acting on thread 39 and to prevent the unscrewing of the lower cylinder 26 from the barrel coupling 36 a taper 37 and bevel 38 have to have an angle α relatively to the vertical symmetry axis of the lower plunger 34 determined by the following formulae:

$$\alpha \leq \frac{1}{2}\text{Arc}\sin\left(\frac{2Fh}{MV_0^2}\right),$$

where F is the minimal required force applied for screwing up a lower cylinder 26, h is a length of interaction between taper 37 of the lower plunger 34 and bevel 38 of the lower cylinder 26 during the re-entering of the lower plunger 34 into the lower cylinder 26 on the downstroke of the pumping unit, M is a total weight of all sucker rods, plungers and polish rod and $V_0$ is vertical velocity of the lower plunger 34 on downstroke determined by formulae:

$$V_0 = \frac{L_{str}N_{str}}{30},$$

where $L_{str}$ is the length of stroke of the pumping unit, $N_{str}$ is number of strokes per minute of the pumping unit.

In particular, $\alpha \leq 15°$ for the following parameters: F=40000 N, h=0.008 m, M=3500 kg, $L_{str} = 3$ m and $N_{str} = 6$. $L_{str} = 3$ m, $N_{str} = 6$.

Referring to FIG. 3 there is shown a lower cylinder 26 having an upset 40 of its outer diameter at the upper end, i.e. the diameter $D_3$ is bigger than diameter $D_4$. Therefore a collet 41 connected to the butt lower end of the barrel coupling 36 by means of at least one screw 42 prevents the moving and, as a result, the unscrewing of the lower cylinder 26 from the barrel coupling 36 along thread 39 during operation of apparatus. The collect 41 could consist of two semi-rings for convenient attaching to the barrel coupling 36.

Figure 4:
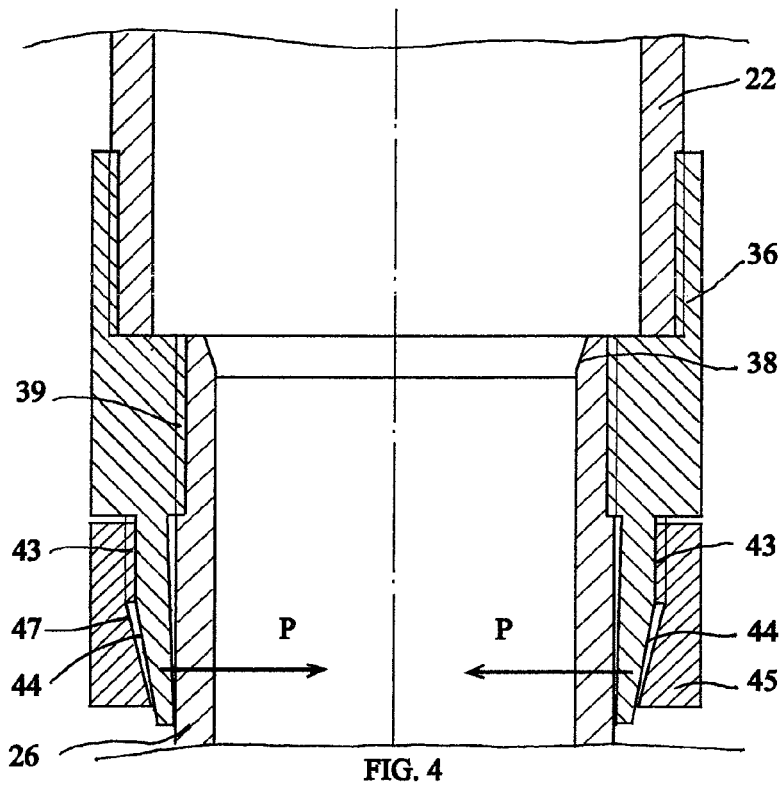
FIG. 4 is a cross-sectional view of the compression chamber, lower cylinder, barrel coupling having an outer thread and taper, and a beveled nut with bevel.

Referring to FIG. 4 there is shown a barrel coupling 36 having an additional outer thread 43 and a taper 44 at its lower end. The barrel coupling 36 is connected to a beveled nut 45 having a bevel 47 at its lower end by means of thread 43 in such manner that during the screwing up of beveled nut 45 onto the barrel coupling 36 and interacting between bevel 47 on beveled nut 45 and taper 44 on the barrel coupling 36 a squeezing force P from beveled nut 45 acting on the outer surface of the lower cylinder 26 via taper 44 on the barrel coupling 45 is created thereby preventing the unscrewing of the lower cylinder 26 from the barrel coupling 36 during operation of the apparatus.

While in accordance with the provisions of the Patent Statutes the preferred forms and the embodiments of the invention have been illustrated and described, it will be apparent to those of ordinary skill in the art various changes and modifications may be made without deviating from the inventive concepts set forth above.

What is claimed is:

1. An apparatus for producing shock waves in a borehole of a well filled or partially filled by a liquid comprising:
   a) a tubing string extending downwardly into the borehole of the well filled or partially filled by a liquid;
   b) an elongated damper cylinder connected to a bottom of the tubing string at an upper end and to a damper chamber at a lower end, and said damper chamber is connected to an upper cylinder, and said elongated cylinder has a different internal diameter than an internal diameter of said upper cylinder;
   c) a damper plunger movably arranged within said elongated damper cylinder and connected to a pumping unit by means at least one sucker rod and polish rod at an upper end and to an upper plunger, movably arranged within said upper cylinder, at a lower end for creating a constant counterforce inside said damper chamber on an upstroke of the pumping unit as a result of constant flow of fluid from the damper chamber into the borehole of the well or from the borehole of the well into the damper chamber through at least one hole on a side surface of damper chamber thereby providing a hydraulic communication between the damper chamber and the borehole;
   d) a lower cylinder and said upper cylinder has a smaller internal diameter than said lower cylinder and connected to said lower cylinder via a compression chamber;
   e) a lower plunger movably arranged within said lower cylinder, and said upper and lower plungers are connected to each other by means of at least one rod for compressing a liquid contained within said compression chamber and discharging the liquid into the borehole of the well when said lower plunger exits out of said lower cylinder on the upstroke of the pumping unit thereby generating a shock wave; and
   f) said lower plunger has a check valve attached to the upper end of said lower plunger and said check valve consists of a cage, a ball and a seat having a hole for supplying a liquid from the borehole into said lower cylinder and compression chamber via an internal channel inside said lower plunger and said hole inside the seat on a downstroke of said pumping unit, and said hole has a diameter determined by the following formulae:

$$d_1 \geq \sqrt{\frac{(D_1^2 - D_2^2)N_{str}(kL_{str})^{\frac{1}{2}}}{30\sqrt{2}\,g}},$$

where $D_1$ is the outside diameter of the lower plunger, $D_2$ is the outside diameter of the upper plunger, $L_{str}$ is the length of the stroke of the pumping unit, $N_{str}$ is the number of the strokes per minute of the pumping unit, k is the coefficient of hydrodynamic resistance of the seat hole and g is a the gravity of acceleration.

2. Apparatus as defined in claim 1, wherein said lower plunger has a taper at the lower end interacting with a bevel made on the upper end of said lower cylinder during the re-entering of the lower plunger into said lower cylinder on the downstroke of the pumping unit and said taper has an angle relatively to vertical symmetry axis of the lower plunger determined by the following formulae:

$$\alpha \leq \frac{1}{2}\text{Arc}\sin\left(\frac{2Fh}{MV_0^2}\right),$$

where F is the minimal required force applied for screwing up the lower cylinder, h is a length of interaction between the taper of the lower plunger and the bevel of the lower cylinder during the re-entering of the lower plunger into the lower cylinder on the downstroke of the pumping unit, M is a total weight of all sucker rods, plungers and polish rod and $V_0$ is the vertical velocity of the lower plunger on downstroke determined by the formulae:

$$V_0 = \frac{L_{str}N_{str}}{30},$$

where $L_{str}$ is the length of stroke of the pumping unit, $N_{str}$ is the number of strokes per minute of the pumping unit.

3. Apparatus as defined in claim 2, wherein said bevel on the lower cylinder has an angle α relative to the vertical symmetry axis of the lower cylinder determined by the following formulae:

$$\alpha \leq \frac{1}{2}\text{Arc}\sin\left(\frac{2Fh}{MV_0^2}\right),$$

where F is the minimal required force applied for screwing up the lower cylinder, h is a length of an interaction between the taper of the lower plunger and the bevel of the lower cylinder during the re-entering of the lower plunger into the lower cylinder on the downstroke of the pumping unit, M is a total weight of all sucker rods, plungers and polish rod and $V_0$ is a vertical velocity of the lower plunger on the downstroke determined by formulae:

$$V_0 = \frac{L_{str}N_{str}}{30},$$

where $L_{str}$ is the length of stroke of the pumping unit, $N_{str}$ is the number of the strokes per minute of the pumping unit.

4. Apparatus as defined in claim 1, wherein said lower cylinder having an upset of an outer diameter at the upper end and said compression chamber are connected to each other by means of corresponding threads inside a barrel coupling which in turn is connected at a butt lower end to a butt upper end of a collet by at least one screw, and said thread inside a barrel coupling connecting said barrel coupling to a lower cylinder has a diameter equaled to a diameter of said lower cylinder upset, and an internal diameter of said collet has a diameter smaller than an outer diameter of said lower cylinder upset thereby preventing the downward movement of the barrel coupling connected to the collet and unscrewing of the lower cylinder from said barrel coupling during operation of the apparatus.

5. Apparatus as defined in claim 1, wherein said compression chamber and the lower cylinder are connected to each other by means of corresponding threads inside of a barrel coupling having an additional outer thread and a taper at the lower end, and said barrel coupling is connected to a beveled nut having a bevel at the lower end by means of said outer thread on said barrel coupling and an internal thread on said beveled nut in such manner that during the screwing up of said beveled nut onto the barrel coupling and interacting between said bevel on the beveled nut and taper on the barrel coupling a squeezing force from said beveled nut acting on an outer surface of the lower cylinder via said taper on the barrel coupling is created thereby preventing the unscrewing of the lower cylinder from said barrel coupling during the operation of the apparatus.

6. A method for producing shock waves in borehole of a well filled or partially filled by a liquid, comprising the steps of:
  a) positioning a device connected to a bottom of a tubing string extending downwardly into the borehole of the well filled or partially filled by the liquid and consisting of:
    i) an elongated damper cylinder connected to a bottom of said tubing string at an upper end and to a damper chamber at a lower end;
    ii) an upper cylinder connected to a damper chamber, and said elongated damper cylinder has a different internal diameter than internal diameter of said upper cylinder and said damper chamber has a hydraulic connection with borehole of the well via at least one hole on a side surface of the damper chamber;
    iii) a damper plunger movably arranged within said elongated damper cylinder and connected to a pumping unit by means of at least one sucker rod and polish rod at an upper end and connected to an upper plunger by at least one sucker rod at the lower end for creating a constant counterforce inside said damper chamber on an upstroke of the pumping unit as a result of a constant flow of fluid from the damper chamber into the borehole of the well or from the borehole of the well into the damper chamber through at least one hole on the side surface of the damper chamber;
    iv) a lower cylinder connected to said upper cylinder via a compression chamber and said upper cylinder has a smaller internal diameter than an internal diameter of said lower cylinder;
    v) a lower plunger connected to said upper plunger by means of at least one sucker rod and said upper and lower plungers movably arranged within said upper and lower cylinders, correspondingly, for compressing the liquid contained within said compression chamber and discharging the liquid into the borehole when said lower plunger exits out of said lower cylinder on the upstroke of the pumping unit thereby generating a shock wave;
  b) providing an exit of said lower plunger out of said lower cylinder at a top of the upstroke of the pumping unit on a distance $\lambda$ determined by the following formulae:

$$\lambda \geq \frac{(D_1^2 - D_2^2)A_{sw}H}{Ed_r^2},$$

where $D_1$ is the outside diameter of the lower plunger, $D_2$ is the outside diameter of the upper plunger, $A_{sw}$ is the required amplitude of the generated shock wave, H is the depth of the lower plunger position at the top of the upstroke of the pumping unit, E is a modulus of elasticity of the sucker rod's material, $d_r$ is the diameter of the sucker rods.

* * * * *